(12) United States Patent
Hirano (10) Patent No.: US 10,996,534 B2
(45) Date of Patent: May 4, 2021

(54) ELECTRO-CHEMICAL DEVICE

(71) Applicant: STANLEY ELECTRIC CO., LTD., Tokyo (JP)

(72) Inventor: Tomoya Hirano, Kawasaki (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 311 days.

(21) Appl. No.: 16/255,103

(22) Filed: Jan. 23, 2019

(65) Prior Publication Data

US 2019/0155062 A1    May 23, 2019

Related U.S. Application Data

(63) Continuation of application No. PCT/JP2017/026848, filed on Jul. 25, 2017.

(30) Foreign Application Priority Data

Jul. 25, 2016    (JP) ............................. JP2016-145747

(51) Int. Cl.
*G02F 1/07*      (2006.01)
*G02F 1/1506*      (2019.01)
*G02F 1/19*      (2019.01)
*G02B 27/01*      (2006.01)
*G02F 1/00*      (2006.01)

(52) U.S. Cl.
CPC ....... *G02F 1/1506* (2013.01); *G02B 27/0101* (2013.01); *G02F 1/0018* (2013.01); *G02F 1/19* (2013.01); *G02F 2201/12* (2013.01)

(58) Field of Classification Search
CPC ........ G02F 1/1506; G02F 1/0018; G02F 1/19; G02F 2201/12; G02B 27/0101
USPC ......................................... 359/241, 245, 265
See application file for complete search history.

(56) References Cited

U.S. PATENT DOCUMENTS 5,232,574 A * 8/1993 Saika ..................... C08G 61/12
204/290.11
2014/0218781 A1    8/2014 Kobayashi et al.

FOREIGN PATENT DOCUMENTS

WO      2012118188 A2    9/2012

* cited by examiner

*Primary Examiner* — William Choi
(74) *Attorney, Agent, or Firm* — Holtz, Holtz & Volek PC (57) ABSTRACT

An electro-chemical device having a cell thickness of 1 μm-1000 μm, comprising a first and a second substrate disposed to face each other, and having electrodes on facing surfaces, transparent electrolyte solution sandwiched between the first and the second substrates, containing electro-deposition material containing Ag, mediator, supporting electrolyte, and solvent, and having optical density not larger than 0.1 in visible light range of wavelength 400 nm-800 nm.

15 Claims, 6 Drawing Sheets

| SAMPLE \ COMPOSITION | Ag SALT (350mM) | SUPPORTING SALT (700mM) | MEDIATOR (30mM) | SOLVENT |
|---|---|---|---|---|
| RF | AgBr | LiCl | $CuCl_2$ | GBL |
| S1 | AgBr | LiCl | $GeCl_4$ | GBL |
| S2 | AgBr | LiCl | $TaCl_5$ | GBL |

GBL : GAMMA BUTYL LACTONE

ELECTRO-CHEMICAL DEVICE

CROSS REFERENCE TO RELATED APPLICATION

This application is based on and claims the benefit of priority from Japanese Patent Application No. 2016-145747, the entire content of which is incorporated herein by reference.

BACKGROUND OF THE INVENTION

Field

This invention relates to an electro-deposition (ED) type electro-chemical device, including electrolyte solution between opposing (facing) electrodes and being capable of performing deposition/solution of a mirror layer of Ag by electro-chemical reaction.

Related Art

An ED type display device or neutral density filter utilizing electro-deposition (ED) material and being capable of controlling transmitting light intensity by varying optical properties of the ED material has been provided.

As operating mode of the display device, not only bright/dark switch-over display, but also making display plane in mirror plane is desired. For example, an ED element capable of forming a mirror layer on one of the opposing surfaces is proposed.

An ED element provided with a transparent electrode having a flat plane on one of the opposing surfaces of a pair of glass substrates, and a modified electrode having minute unevenness on the other opposing surface, sandwiching electrolyte solution including ED material containing Ag, mediator containing Cu, supporting electrolyte, and solvent, between the electrodes, and being capable of precipitating Ag on one of the electrodes by applying a predetermined voltage between the electrodes, is proposed (for example, WO 2012/118188 the whole content of which is incorporated herein by reference).

Transparent or translucent electrode can be formed of indium tin oxide (ITO), indium zinc oxide (IZO), etc. Modified electrode can be formed by attaching particles on electrode surface to give surface roughness. As the ED material containing Ag, such materials as $AgNO_3$, $AgClO_4$, AgBr, etc. can be used. The mediator is a material which oxidizes or reduces electro-chemically at a lower energy than silver. Mediator is preferably salt of copper ion of bivalence, and such materials as $CuCl_2$, $CuSO_4$, $CuBr_2$, etc. can be used. It is said that discoloring reaction by oxidation can be assisted by oxide of mediator functioning to receive electron from silver. Supporting electrolyte can be any material provided that it enhances oxidation/reduction reaction etc. of ED material. For example, lithium salt such as LiCl, potassium salt such as KCl, and sodium salt such as NaCl can be used. Solvent can be any material provided that it can stably hold the ED material etc. For example, polar solvent such as water, non-polar organic solvent, ionic solvent, ion conductive polymer, polymer electrolyte etc. can be used.

In the absence of applied voltage, ED element is transparent or translucent. When Ag precipitates on a flat transparent electrode by application of a predetermined voltage, a mirror surface appears. When Ag precipitates on a modified electrode by application of a predetermined voltage, a black surface appears. When the ED element is left in the absence of applied voltage or in as state under application of a voltage of reverse polarity, the Ag layer solves to recover transparent state.

Practically, the ED element appears little bit colored yellow. This is considered to be due to the influence of mediator such as $CuCl_2$ etc. Such coloring to some extent can be improved by thinning the thickness of the ED element. Namely, by thinning the thickness of the ED element, the element can be brought into more colorless transparent state.

SUMMARY

Conventional ED element have no problem in display characteristics in ordinary driving. However, the research of the present inventor revealed that there are some cases where display characteristics may be influenced by some specific lights to which the element is exposed. Particularly, in the use where high brightness lights such as laser beams are irradiated on the ED element, the ED element may easily cause changes in the response characteristics in the light irradiated part. Stable operation may not be expected. Also, in the use of direct watching such as in the head-up display (HUD), the light irradiated part may cause some irregularities to degrade the looking.

Electrolyte solution containing mediator which contains cupper is colored. If the cell thickness is thick and the concentration of cupper mediator is high, light transmission factor becomes low. This is considered to arise from the absorption structure in response to lights in the visible light range. It is considered that when lights of high brightness are irradiated, light absorption becomes intense and changes in the characteristics occur.

It is desired to provide an electro-chemical device which does not cause changes in the response characteristics in use.

According to an embodiment, there is provided an electro-chemical device having a cell thickness in a range of 1 μm-1000 μm, comprising:

a first and a second substrate disposed to face each other, and having electrodes on facing surfaces; and transparent electrolyte solution sandwiched between the first and the second substrates, containing electro-deposition material containing Ag, mediator, supporting electrolyte, and solvent, and having optical density not larger than 0.1 in visible light range of wavelength 400 nm-800 nm.

Even when display is performed by applying a voltage between the first and the second substrates to conduct deposition/solution of Ag while external light is introduced, the electrolyte solution is hard to generate light absorption in the visible light range, and response characteristics are hard to cause change.

DESCRIPTION OF THE PREFERRED EMBODIMENTS

First, brief description will be made on an electro-chemical device constituting a variable mirror device disclosed in WO2012/118188, referring to FIGS. 1A, 1B and 1C.

Figure 1A:
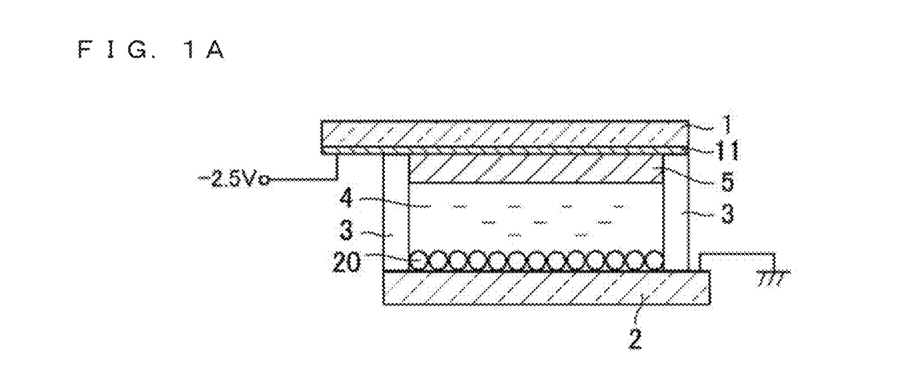
FIGS. 1A and 1B are cross-sections of an electro-chemical mirror device according to conventional art.

As is illustrated in FIG. 1A, a glass substrate 1 formed with a flat and transparent (ITO) electrode 11 and another glass substrate 2 formed with granular or particle-like modified electrode 20 (formed on a flat and transparent electrode) are disposed to face the electrode each other and enclosed by a seal 3 to form a cell. Electrolyte solution 4 is injected in the cell by vacuum injection to establish an electro-chemical device. The electro-chemical device is in transparent state, and transmits light. One drop filling (ODF) may be adapted in place of vacuum injection. The electrolyte solution 4 contains electro-deposition (ED) material including Ag, mediator including Cu, supporting electrolyte, and solvent.

When a DC voltage is applied between the transparent electrode 11 and the modified electrode 20, Ag atoms precipitate on the electrode applied with a negative polarity voltage. As is illustrated in FIG. 1A, when a negative polarity voltage of for example −2.5 V is applied to the flat transparent electrode 11, a mirror like reflection layer 5 precipitates on the transparent electrode 11. This state is also called a mirror.

Figure 1B:
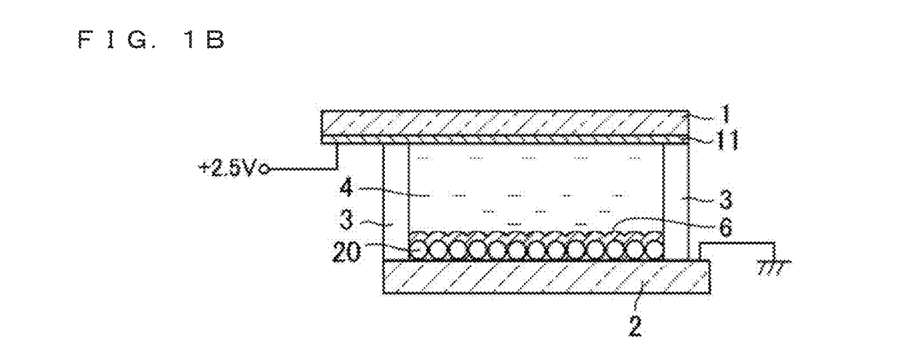

As is illustrated in FIG. 1B, when a negative polarity voltage of for example −2.5 V is applied to the modified electrode 20, Ag atoms precipitate on the modified electrode 20. Since the modified electrode 20 has minute irregularities (convex and/or concave surfaces), precipitated Ag films 6 form randomly reflective or diffusedly reflective film, and looks black. This state is also called a black film. As such, when a voltage is applied between the transparent electrode and the modified electrode, a mirror film or a black film can selectively be formed depending on the selection of the negative polarity electrode.

When the applied voltage is released and the device is left alone, the precipitated Ag film solves and the electro-chemical device returns to the transparent state. This state is also called bleach (a bleached electrode). When a voltage having opposite polarity to the applied voltage is applied, speed of returning to the transparent (bleached) state becomes faster.

Figure 1C:
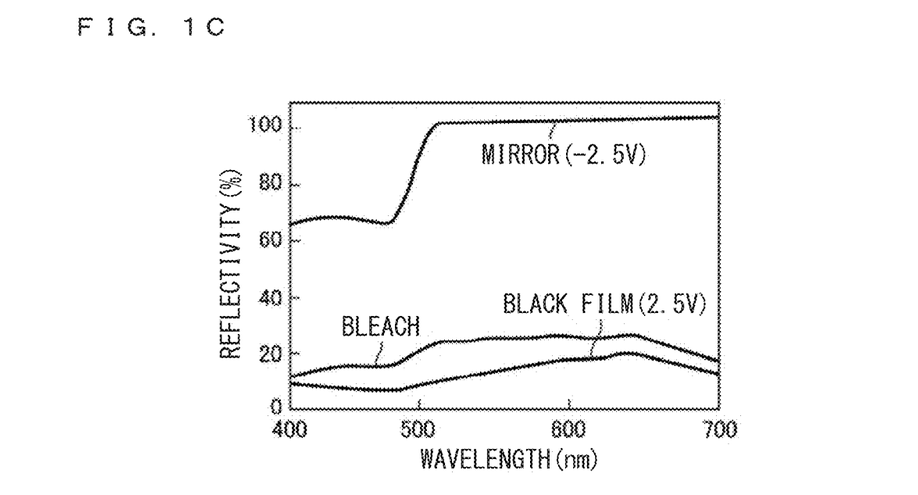
FIG. 1C is a graph of reflectivity thereof.

FIG. 1C is a graph illustrating the optical reflectivity spectra of the mirror, the black film and the bleached electrode, as described above. The mirror has a high reflectivity which the Ag mirror presents. At short wavelength region, the reflectivity decreases to some extent. The bleach in which precipitated Ag film has disappeared is accompanied with a high transmission factor and a reflectivity which depends on the cell structure. The black film establishes a light-shielding state. Here, the film surface is in randomly reflective state, and hence the reflectivity of the film in one direction appears as a low reflectivity. It is possible to present clear and distinct display by selectively and separately using the three states. When display is unnecessary, display area can be driven into a transparent (bleached) state.

When mediator including Cu is used, electrolyte solution becomes colored. The present inventor has searched for mediators which can produce transparent electrolyte solution for realizing an electro-chemical device which will not cause any (color) change in response characteristics even when a high brightness light is irradiated. The present inventor has reached a mediator including Ge, and a mediator including Ta.

Various sample cells are made using mediator including Cu (RF), mediator including Ge (S1) and mediator including Ta (S2), and characteristics are measured. Cells having glass substrates having transparent electrodes made of ITO are disposed to oppose each other. Transparent electrodes are formed all over the soda glass substrates with surface resistivity of 5Ω/□. Cells each having a display area of (20 mm×20 mm) and a cell thickness of 70 μm are formed by using seal material available from ThreeBond Co., Ltd, Japan. Electrolyte solution is vacuum injected into the cell to form electro-chemical cells.

Figure 2A:
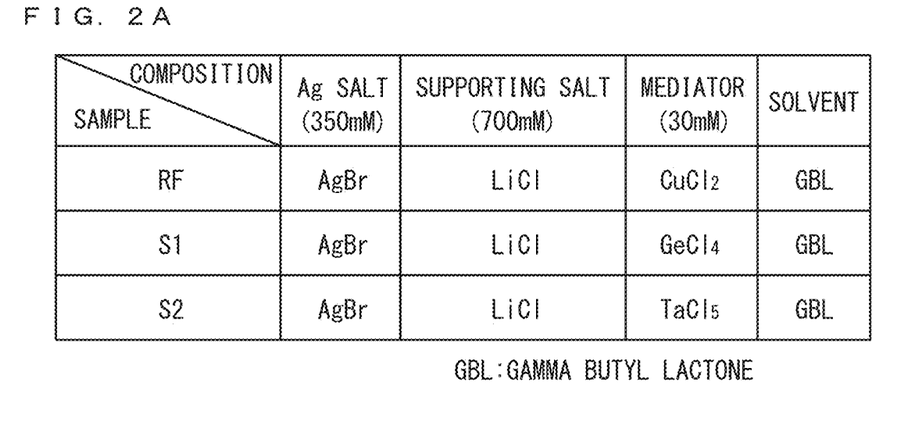
FIG. 2A is a table listing constituent compositions of electrolyte solutions of reference sample and example samples of embodiment.

FIG. 2A is a table listing constituent compositions of electrolyte solutions of the reference sample RF, and the example samples S1 and S2. All the samples include gammma-butyrolactone (GBL) as the solvent, AgBr of concentration 350 mM as the Ag salt, and LiCl of concentration 700 mM as the supporting salt. The concentration of mediator is set at 30 mM. In the reference sample RF, mediator $CuCl_2$ of the conventional art is used. In the example samples S1 and S2, mediators $GeCl_4$ and $TaCl_5$ are used.

Here, solvent is not limited to GBL. The solvent is only required to stably hold the ED materials, etc. and can be formed of polar solvent as water etc., organic solvent having no polarity, ionic liquid, ion-conducting polymer, polymer electrolyte etc. Ag salt is not limited to AgBr. LiCl supporting salt may be replaced with Li salts such as LiBr, LiI, $LiBF_4$, $LiClO_4$, etc., K salts such as KCl, KBr, KI, etc., and Na salts such as NaCl., NaBr, NaI, etc.

Figure 2B:
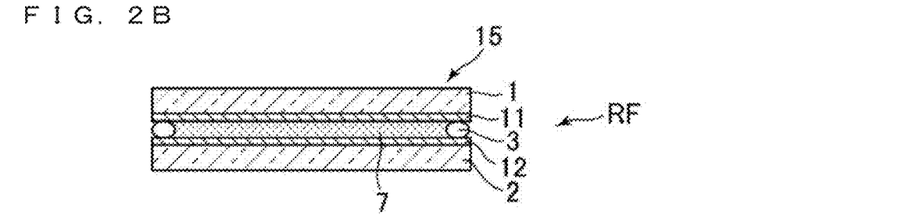
FIGS. 2B and 2C are side views schematically illustrating ED elements of the reference sample and the example samples of the embodiment.

FIG. 2B is a side view schematically illustrating the reference sample RF. The reference sample RF is made by injecting electrolyte solution 7 into a cell formed of pasting a glass substrate 1 formed with a transparent electrode 11 from ITO, IZO etc. and another glass substrate 2 formed with a similar transparent electrode 12 via seal 3. The electrolyte solution 8 is colored in dark blue. Here, for inspecting precipitation of an Ag layer on an electrode, it is necessary that at least one of the electrodes should be transparent. When both of the facing electrodes are transparent, a transparent and plain window can be realized. The substrate can also be formed of plastic etc. in place of glass.

Figure 2C:
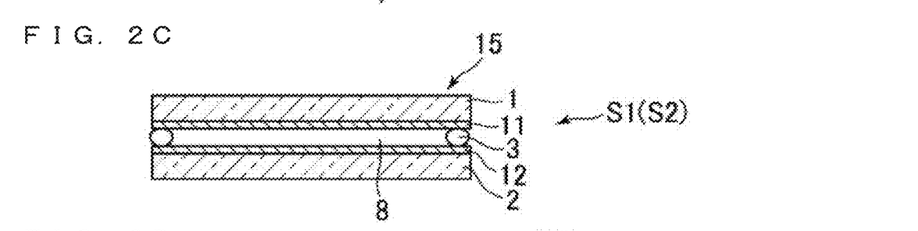

FIG. 2C is a side view schematically illustrating an example sample S1 or S2. Similar to the reference sample RF, each cell 15 is formed by pasting a glass substrate 1 formed with a transparent electrode 11 with another glass substrate 2 formed with a transparent electrode 12 through seal 3. Electrolyte solutions 8 are injected into the cells to form example samples S1 and S2. The electrolyte solution 8 of the example sample S1 includes $GeCl_4$ as the mediator, and the electrolyte solution 8 of the example sample S2 includes $TaCl_5$ as the mediator. The electrolyte solutions 8 are in colorless state.

Figure 2D:
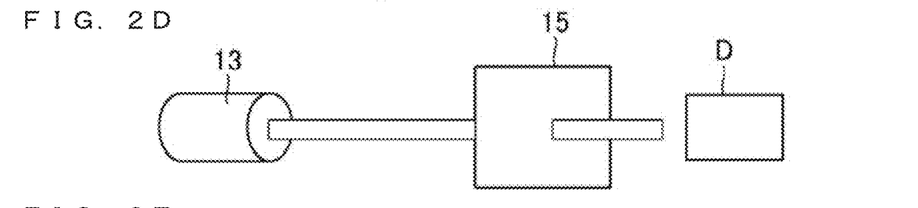
FIG. 2D is a side view illustrating a state where a laser light is irradiated on the ED element.

FIG. 2D is a perspective view schematically illustrating the manner of experiment of high brightness light irradiation. As the laser light source 13, a blue laser having a peak wavelength of 438 nm, a light intensity of 50 mW, and a beam diameter of 8 mm is used, and the blue laser light is irradiated on the cell 15.

Figure 2E:
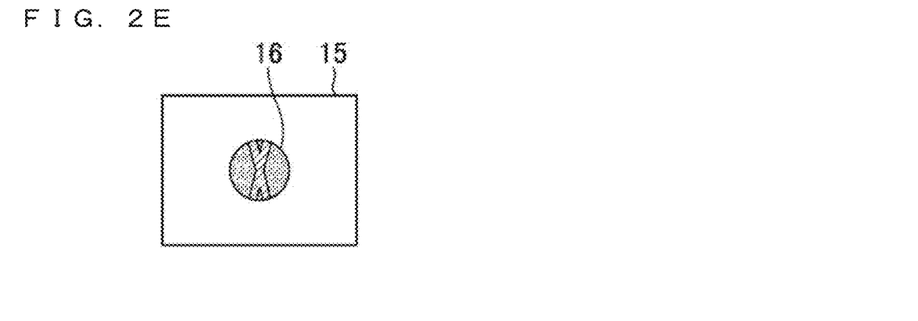
FIG. 2E is a plan view illustrating a light irradiation pattern on the ED element.

FIG. 2E is a plan view schematically illustrating the state of irradiating the blue laser on the cell 15. A laser beam irradiation region 16 having a diameter of 8 mm is formed at a part of the display area of 20 mm square (20 mm×20 mm).

Ag layer is precipitated/solved by applying a voltage to the cell, and the change of transmission factor is measured. Measuring instrument used is LCD 5200 available from Ohtsuka Electronics, Japan. The light intensity in no cell state is set as the transmission factor 100%. Transmission factor is obtained from the relative light intensity transmitted through the cell relative to the light intensity in the no cell state. As the transmission factor, visibility transmission factor is calculated. Time required to change from the maximum transmission factor through the cell (about 78%) to 10% (8%) of the maximum transmission factor is defined as the coloring speed, and time required to change from 10% (8%) of the maximum transmission factor to 90% of the maximum transmission factor is defined as the discoloring speed. Coloring speed and discoloring speed may be collectively called response speed. Blue laser light is irradiated for 20 minutes, and the change in the response speed is measured.

Absorption spectrum of the electrolyte solution is also measured. As the measuring instrument, fiber multi-channel spectrometer USB 4000 available from Ocean Optics Inc. USA is used. The light intensity transmitted through 1 cm cuvette containing only solvent GLB is set as 100% ($I_0$). Light transmission factor ($I/I_0$) is obtained from the light intensity (I) transmitted through the cell containing electrolyte solution in place of GLB divided by the light intensity transmitted through the cell containing only the solvent ($I_0$).

Figure 3A:
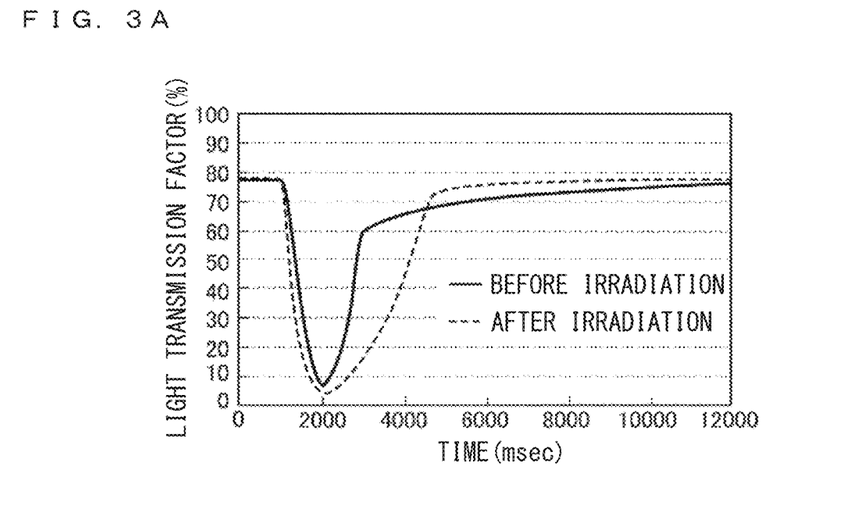
FIG. 3A is a graph illustrating response characteristics of the reference sample to light before and after irradiation of high brightness light.

FIG. 3A is a graph illustrating change in the light transmission factor through the reference sample RF upon application of a voltage. The abscissa represents lapse of time in the unit of msec, and the ordinate represents transmission ($I/I_0$) in the unit of %. A voltage is applied from lapse of time at 1000 msec to lapse of time at 2000 msec, to precipitate Ag layer. Thereafter, a reverse voltage is applied which accelerates solution. The solid line represents characteristics before irradiation of blue laser light, and broken line represents characteristics after irradiation of blue laser light for 20 minutes.

The initial transmission factor is about 78%. In the cell before irradiation of blue laser light, the transmission factor rapidly decreases from the application of a voltage at the lapse of time at 1000 msec, and the transmission factor becomes less than 10% before the lapse of time of 2000 msec. It is considered that this represents formation of a mirror surface by the precipitation of an Ag layer. A reverse voltage is applied after the lapse of time of 2000 msec. The transmission factor rises as it represents solving of the Ag layer into the electrolyte solution, and recovers about 60% at the lapse of time of 3000 msec. After lapse of time of 3000 msec, the recovering speed changes low, and the transmission factor slowly increases. At the lapse of time of 12000 msec, the transmission factor becomes a value close to the initial transmission factor. Thereafter a blue laser light of high intensity is irradiated for 20 minutes.

Figure 3B:
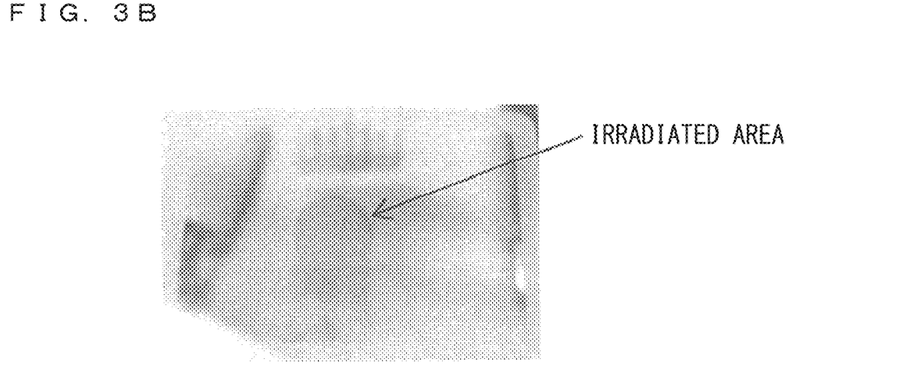
FIG. 3B is a photograph showing irregularities occurred in the reference sample after irradiation of high brightness light.

FIG. 3B is a photograph of the cell after irradiation of blue laser. Trace is formed at the laser irradiation area 16, and visibly recognizable change is generated. When the optical property of the cell changes so much, it is considered that the characteristics should also change.

The broken line in FIG. 3A represents change in the transmission factor measured upon formation/solution of an Ag layer after irradiation of blue laser light, similar to solid line representing transmission factor before irradiation of blue light laser. A voltage is applied to the cell from lapse of time about 1000 msec to about 2000 msec, to precipitate Ag layer. Thereafter, a reverse voltage is applied.

Lowering of the transmission factor by the application of the voltage appears somewhat stronger than before the irradiation of the laser light. Together with the release of the applied voltage (application of a reverse voltage), the transmission factor is recovering. The recovering speed is apparently slower than before irradiation of the laser light, and the change of recovering speed in halfway recognized before irradiation of the laser light is not observed. Apparently different characteristics are shown. From the practical point of view, some problem may occur in reproducibility.

Figure 4A:
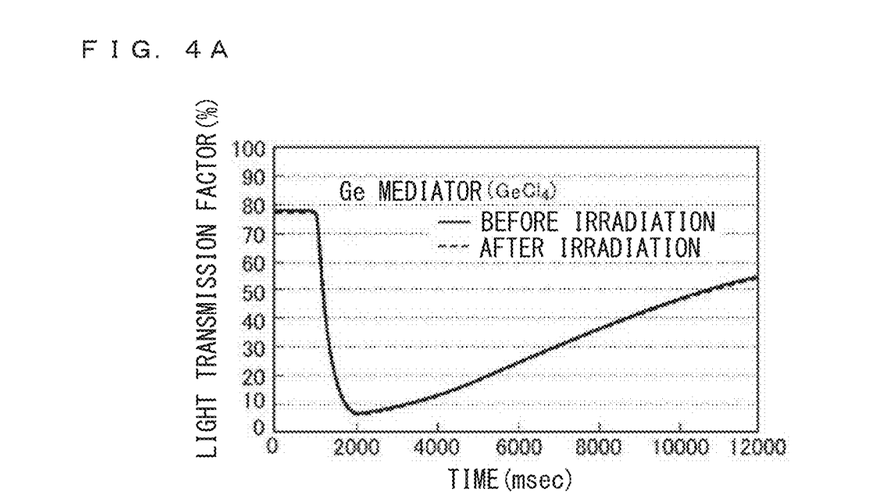
FIGS. 4A and 4B are graphs illustrating response characteristics of the example samples of the embodiment to light before and after irradiation of high brightness light, the example samples containing mediator including Ge or Ta.

FIG. 4A is a graph illustrating change in the characteristics of the transmission factor of the example sample S1 using Ge mediator before and after irradiation of the blue laser. Almost similar to the case of reference sample RF, before irradiation of the laser light a voltage is applied to the cell from the lapse of time of about 1000 msec to about 2000 msec to precipitate an Ag layer, and a reverse voltage is applied after the lapse of time of about 2000 msec to dissolve the Ag layer. The figure shows up to the lapse of time of 12000 msec.

After dissolving the Ag layer, blue laser light is irradiated for 20 minutes. Thereafter, similar to before the irradiation of the blue laser light, along with the lapse of time application of voltage and application of reverse voltage is done, and change in the transmission factor is measured. Change in the transmission factor after the irradiation of the laser light is not discriminative from change in the transmission factor before the irradiation of the laser light. No effect of blue laser light irradiation is recognized from the transmission factor.

Figure 4B:
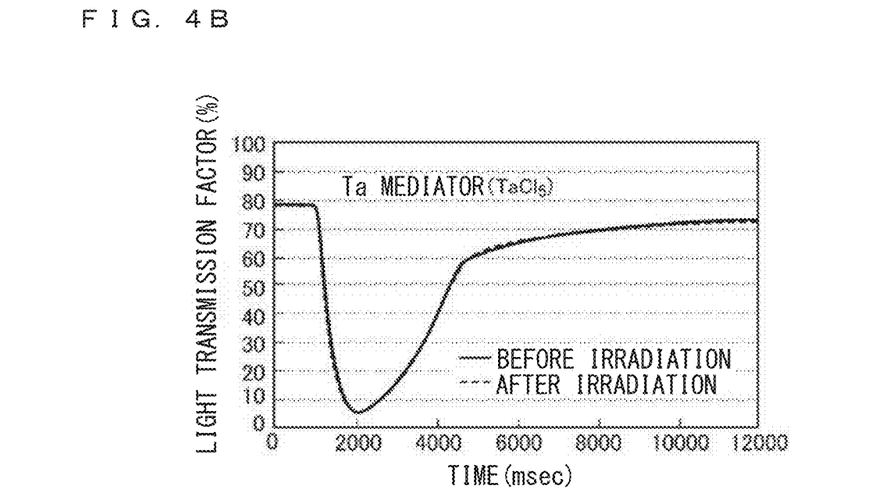

FIG. 4B is a graph illustrating change in the characteristics of the transmission factor of the example sample S2 using Ta mediator before and after irradiation of the blue laser. Almost similar to the case of reference sample RF, a voltage is applied to the cell from the lapse of time of about 1000 msec to about 2000 msec to precipitate an Ag layer, and a reverse voltage is applied after the lapse of time of about 2000 msec to dissolve the Ag layer. The figure shows up to the lapse of time of 12000 msec.

After dissolving the Ag layer, blue laser light is irradiated for 20 minutes. Thereafter, similar to before the irradiation of the blue laser light, along with the lapse of time, application of voltage and release of applied voltage (application of reverse voltage) is done, and change in the transmission factor is measured. Change in the transmission factor after the irradiation of the laser light is not discriminative from change in the transmission factor before the irradiation of the laser light. No effect of blue laser light irradiation is recognized from the transmission factor.

FIG. 3A showed a phenomenon that when the Cu mediator of the prior art is used, the response speed of Ag layer formation (coloring speed) and the response speed of Ag layer dissolving (discoloring speed) change (become slower) by the laser light irradiation. FIGS. 4A and 4B show when Ge mediator of example sample S1 and Ta mediator of example sample S2 are used, at least large change in the response speed is not recognized.

Figure 5A:
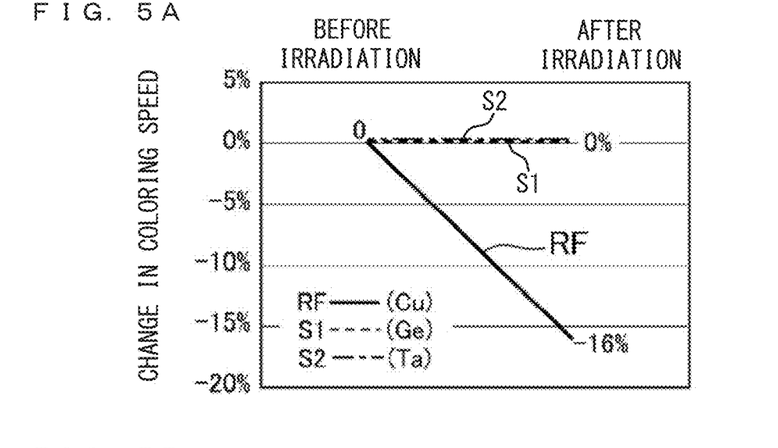
FIGS. 5A, 5B, and 5C are graphs comparatively illustrating A) coloring response characteristics to light before and after irradiation of high brightness light in the reference sample RF and the example samples S1 and S2 of the embodiment, B) discoloring response characteristics to light before and after irradiation of high brightness light in the reference sample RF and the example samples S1 and S2 of the embodiment, and C) optical density characteristics of the reference sample RF and the example samples S1 and S2 of the embodiment.

FIG. 5A is a graph illustrating change in the coloring speed. In the reference sample RF, the coloring speed changes by about −16% by the irradiation of laser light. In the example sample S1 using Ge mediator and in the example sample S2 using Ta mediator, in both cases the coloring speed is substantially 0%. Change in the coloring speed is suppressed and the response is extremely reproducible.

Figure 5B:
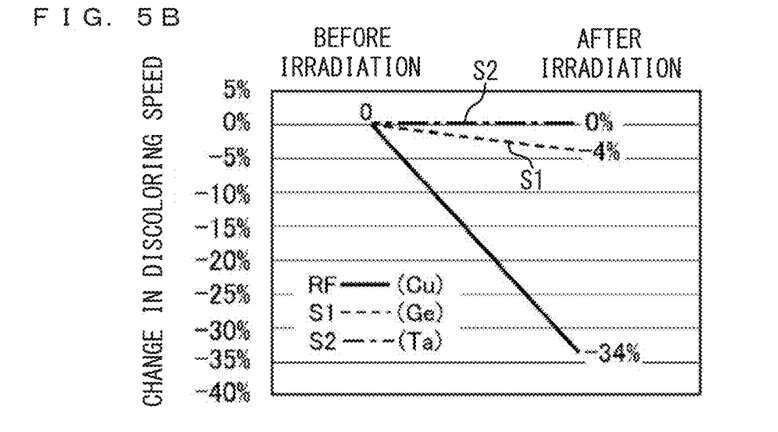

FIG. 5B is a graph illustrating change in discoloring speed. In the reference sample RF, the discoloring speed changes largely as about −34% by the laser irradiation. In the example sample S1 using Ge mediator, the discoloring speed is as small as −4%, and in the example sample S2 using Ta mediator, the discoloring speed has no change as about 0%. From the viewpoint of reproducibility, it can be said that large improvement is made.

Figure 5C:
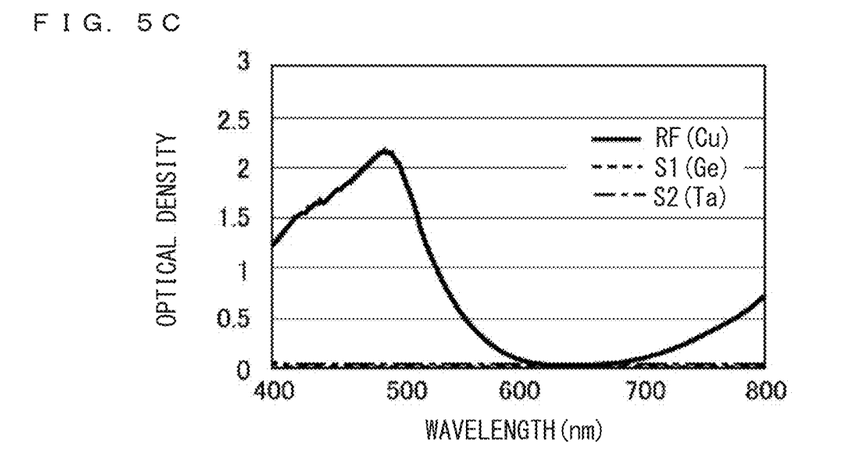

FIG. 5C is a graph illustrating optical density spectra of respective samples in visible light region of wavelength 400 nm-800 nm. The optical density is the common logarithm of the inverse of the transmission factor. The abscissa represents wavelength in the unit of nm, and the ordinate represents optical density $\log_{10}(I_0/I)$.

The reference sample RF shows wide absorption band with a peak near wavelength 500 nm, and also shows absorption structure in near infrared region above wavelength about 700 nm. These absorption structures will absorb lights and the electrolyte solution will present dark blue. It is considered that when laser light of wavelength 438 nm is irradiated, strong absorption will appear and light responsive phenomenon will occur.

In the example sample S1 using Ge mediator and the example sample S2 using Ta mediator, the optical density is not larger than (below) 0.1 in the wavelength range of 400 nm-800 nm, as shown in FIG. 5C. The electrolyte solutions of these samples are colorless. Since there arise no light absorptions, it is considered that light responsive phenomenon does not occur even when laser light is irradiated. It will be appropriate to form an electrochemical device having a cell thickness not less than 1 μm and not larger than 1000 μm (a cell thickness of 1 μm-1000 μm), and having a mediator concentration of not higher than 5M.

By using such cell of stable characteristics, electrochemical devices of display, ND (neutral density) filter, etc. having stable characteristics can be provided.

Figure 6A:
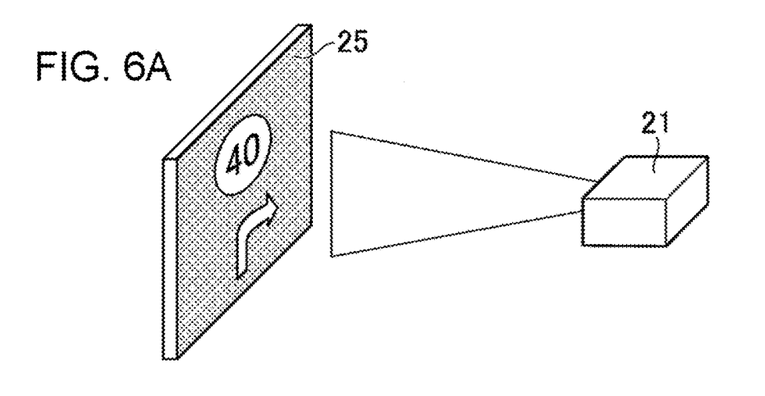
FIGS. 6A and 6B are perspective views of examples of the applied ED cell to a combiner of a head-up display and to a neutral density (ND) filter for a head-up display.

FIG. 6A is a perspective view illustrating a case where the ED element is used in a variable combiner of a head-up display (HUD). A mirror device 25 is installed for example in a window of a vehicle. The mirror device is normally in transparent state. When display becomes necessary, the ED element 25 is activated so that the image projected from the projector 21 can be observed. When the necessity is extinguished, the ED element can recover the transparent state.

Figure 6B:
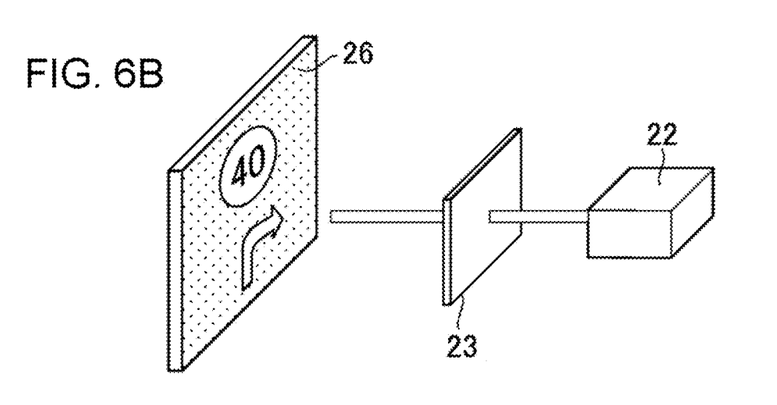

FIG. 6B is a perspective view illustrating the case where an ED element is used as a neutral density (ND) filter 23 in a head-up display (HUD) using a laser projector 22. In a laser projector 22, it is difficult to adjust the brightness in the light source. The flux of light projected from the laser projector is attenuated to an appropriate brightness in an ND filter 23 using an ED element. Display 26 appropriately adjusted to the outside brightness and without glare can be given.

In either case of FIGS. 6A and 6B, for the light beam from a laser light source, an optical system is formed using an ED element the optical density of which may be lower than 0.1. When blue light 438 nm is included in the laser lights as in the blue laser, a mirror device using Ge or Ta as mediator is used. By this construction, it becomes possible to realize stable operation even using a laser light source.

Although description has been made on preferred embodiments, these descriptions are not restrictive. For example, exemplified shape and color are only examples and are not restrictive. It will be apparent to those skilled in the art that various changes, modification, substitutions, improvements etc. are possible within the scope of appended claims.

What are claimed are:

1. An electro-chemical device having a cell thickness in a range of 1 μm-1000 μm, comprising:
    a first and a second substrate disposed to face each other, and having electrodes on facing surfaces;
    transparent electrolyte solution sandwiched between the first and the second substrates, containing electro-deposition material containing Ag, mediator, supporting electrolyte, and solvent, and having optical density not larger than 0.1 in visible light range of wavelength 400 nm-800 nm.

2. The electro-chemical device according to claim 1, wherein the mediator includes Ge.

3. The electro-chemical device according to claim 2, wherein the mediator includes $GeCl_4$.

4. The electro-chemical device according to claim 1, wherein the mediator includes Ta.

5. The electro-chemical device according to claim 4, wherein the mediator includes $TaCl_5$.

6. The electro-chemical device according to claim 1, wherein the mediator has concentration not larger than 5M.

7. The electro-chemical device according to claim 1, wherein the electro-deposition material includes at least one of $AgNO_3$, $AgClO_4$ and AgBr.

8. The electro-chemical device according to claim 1, wherein the electrode of the first substrate includes a transparent electrode having a flat surface, and the electrode of the second substrate includes a transparent electrode having minute unevenness.

9. The electro-chemical device according to claim 1, wherein the electro-chemical device is a variable combiner of vehicle head-up display.

10. Optical system comprising:
    a laser light source, and
    an electro-chemical device adapted to receive laser light from the laser light source,
    wherein the electro-chemical device includes a first and a second substrate disposed to face each other, and having electrodes on facing surfaces, and electrolyte solution being transparent in visible light range, sandwiched between the first and the second substrates, and containing electro-deposition material containing Ag, mediator, supporting electrolyte, and solvent, and the electro-chemical device has optical density not larger than 0.1 relative to the laser light.

11. The optical system according to claim 10, wherein said electrolyte solution has an optical density not larger than 0.1 in visible light range of wavelength 400 nm-800 nm.

12. The optical system according to claim 11, wherein said mediator includes Ge.

13. The optical system according to claim 12, wherein said mediator includes GeCl$_4$.

14. The optical system according to claim 11, wherein said mediator includes Ta.

15. The optical system according to claim 14, wherein said mediator includes TaCl$_5$.

* * * * *